(12) United States Patent
Nanno et al.

(10) Patent No.: US 6,805,785 B2
(45) Date of Patent: Oct. 19, 2004

(54) PRODUCTION METHOD OF SINTERED-TYPE NICKEL POSITIVE ELECTRODE FOR ALKALINE SECONDARY BATTERY

(75) Inventors: Tetsuo Nanno, Yao (JP); Yohei Hattori, Fujisawa (JP); Fumihiko Yoshii, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 293 days.

(21) Appl. No.: 10/205,749

(22) Filed: Jul. 26, 2002

(65) Prior Publication Data

US 2003/0039745 A1 Feb. 27, 2003

(30) Foreign Application Priority Data

Aug. 1, 2001 (JP) .......................... 2001-233233
Jun. 21, 2002 (JP) .......................... 2002-181592

(51) Int. Cl.$^7$ ................................. C25D 7/00
(52) U.S. Cl. ................ 205/50; 205/60; 205/122; 205/220
(58) Field of Search ................ 205/50, 60, 122, 205/220

(56) References Cited

U.S. PATENT DOCUMENTS 5,861,225 A * 1/1999 Corrigan et al. ............. 205/60
6,270,535 B1 * 8/2001 Singh ........................ 205/60

FOREIGN PATENT DOCUMENTS

| JP | 04-075257 A | 3/1992 |
|----|-------------|--------|
| JP | 11-102700 A | 4/1999 |

* cited by examiner

Primary Examiner—Robert R. Koehler
(74) Attorney, Agent, or Firm—Akin Gump Strauss Hauer & Feld, LLP

(57) ABSTRACT

The following steps are conducted: preparing a metal salt carried-substrate A by soaking a sintered nickel substrate in an acidic solution containing cobalt ions and at least one metal ions of magnesium ions, iron ions and manganese ions, and drying thus soaked substrate; preparing a hydroxide carried-substrate B by soaking the substrate A in an alkaline solution to deposit cobalt hydroxide and at least one metal hydroxide of magnesium hydroxide, iron hydroxide and manganese hydroxide in the pores and on the surface of the substrate A; obtaining an oxide carried-substrate C by oxidizing the cobalt hydroxide to produce cobalt oxide having a mean cobalt valence of over 2; and obtaining an active material carried-substrate D by soaking the substrate C in a solution containing nickel nitrate dissolved therein, drying thus soaked substrate C, and then soaking thus dried substrate C in an alkaline solution, to fill the active material in the substrate C.

7 Claims, 3 Drawing Sheets

PRODUCTION METHOD OF SINTERED-TYPE NICKEL POSITIVE ELECTRODE FOR ALKALINE SECONDARY BATTERY

BACKGROUND OF THE INVENTION

There has recently been an increasing demand for alkaline secondary batteries with high power and longevity as batteries for power tools or electric automobiles. There has also been a desire for improvement in battery characteristics such as improvement in charge efficiency at a high temperature and discharge characteristic at a low temperature as well as reduction in self-discharge.

Conventionally, a sintered-type nickel positive electrode for an alkaline secondary battery has been produced in the following manner:

First, slurry obtained by mixing a nickel powder, a thickener and water is applied onto a core member, and is sintered in a reducing atmosphere to produce a sintered nickel substrate. This sintered substrate is soaked in a nitric acid aqueous solution containing nickel nitrate dissolved therein (hereinafter referred to as an acidic nickel salt solution) to impregnate nickel nitrate in the pores of the sintered substrate, and is dried and then soaked in an alkaline solution. Thereby, nickel nitrate changes to hydroxide as an active material. Repetition of this operation leads to filling of a pre-determined amount of active material in the pores of the sintered nickel substrate.

There is a problem in the step of soaking the sintered nickel substrate in the acidic nickel salt solution that the surface of the sintered nickel substrate corrodes due to the corrosive effect of the acidic nickel salt solution, which decreases the strength of the sintered nickel substrate. Herein, one of the modes in which a battery life comes to an end is an increase in battery internal resistance attributed to uneven distribution of an electrolyte caused by swelling of a positive electrode plate. The causes for the swelling of the positive electrode include a change, during overcharge of the battery, of $\beta$-Ni(OH)$_2$ which is the main component of the active material, to $\gamma$-NiOOH which has a low density. As the strength of the sintered nickel substrate decreases, as thus described, the swelling of the electrode plate is further accelerated, making the cycle life of the battery shorter.

As solutions to this problem, it has been proposed in Japanese Laid-Open Patent Publication No. Hei 4-75257 that cobalt oxide is produced on the surface of the sintered nickel substrate to suppress the corrosion of the substrate. In this case, the sintered nickel substrate is soaked in a cobalt salt aqueous solution and dried at a temperature of from 90 to 100° C., and is then treated with an alkaline solution to produce cobalt hydroxide on the substrate surface. After this cobalt hydroxide is oxidized, the substrate is soaked in the acidic nickel salt solution. Namely, the oxidation of cobalt hydroxide is conducted for the purpose of suppressing the corrosion of the substrate by the acidic nickel salt solution. However, there is a problem in this proposal that, while the corrosion of the sintered nickel substrate upon impregnation of the active material is suppressed, the active material in the vicinity of the sintered nickel substrate is prone to change to $\gamma$-NiOOH in charging, undesirably deteriorating the cycle characteristic.

On the other hand, it has been proposed in Japanese Laid-Open Patent Publication No. Hei 11-102700 that coprecipitated hydroxide of cobalt and magnesium is produced in the pores of the sintered nickel substrate, and the substrate is then soaked in an acidic nickel salt solution so that an active material is filled in the substrate. It can be considered that this proposal is to enhance the operating voltage of the battery by producing, in soaking the substrate in the acidic nickel salt solution, a solid solution layer on a solid phase interface between coprecipitated hydroxide of cobalt and magnesium and the active material comprising nickel hydroxide. A problem lying in this proposal is that the production of the solid solution layer allows the operating voltage to increase, but is undesirably prone to promote the decomposition of the active material in the charged state, resulting in deterioration of the self-discharge characteristic and reduction in charging efficiency in a high-temperature atmosphere.

SUMMARY OF THE INVENTION

It is an object of the present invention to attain an increase in longevity of an alkaline secondary battery without sacrificing other characteristics thereof, such as a self-discharge characteristic.

The present invention relates to a method for producing a sintered-type nickel positive electrode for an alkaline secondary battery, comprising:

a step (1) of soaking a sintered nickel substrate in an acidic solution containing cobalt ions and at least one metal ions selected from the group consisting of magnesium ions, iron ions and manganese ions, and drying thus soaked substrate to prepare a metal salt carried-substrate A;

a step (2) of soaking the substrate A in an alkaline solution to deposit cobalt hydroxide and at least one selected from the group consisting of magnesium hydroxide, iron hydroxide and manganese hydroxide deposit in pores of and on the surface of the substrate, to prepare a hydroxide carried-substrate B;

a step (3) of oxidizing the cobalt hydroxide to produce cobalt oxide having a mean cobalt valence of over 2, to prepare an oxide carried-substrate C; and a step (4) of filling an active material comprising nickel hydroxide in pores of the substrate C by repeating a series of steps of soaking the substrate C in a solution containing nickel nitrate dissolved therein, drying thus soaked substrate C, and then soaking thus dried substrate C in an alkaline solution, to prepare an active material carried-substrate D.

It is preferable that the step (3) comprises steps of providing the substrate B with an alkali and exposing the alkali provided-substrate B to an air atmosphere at a temperature of not lower than 100° C. and not higher than 150° C. to oxidize the cobalt hydroxide to produce cobalt oxide.

Alternatively, it is preferable that the step (3) comprises a step of electrochemically oxidizing the substrate B in an alkaline solution to oxidize the cobalt hydroxide to produce cobalt oxide.

It is preferable that the alkaline solution used in the step (2) is an aqueous solution containing sodium hydroxide dissolved therein.

It is preferable that in the acidic solution used in the step (1), the concentration of the total amount of the cobalt ions and at least one metal ions selected from the group consisting of magnesium ions, iron ions and manganese ions is not less than 1.2 mol/liter and not more than 2.0 mol/liter, and the proportion of the cobalt ions in the total amount is not less than 30 mol % and not more than 70 mol %.

It is preferable that the method of the present invention further comprises a step (5), subsequent to the step (4), of filling at least one additive selected from the group consisting of yttrium hydroxide, ytterbium hydroxide and calcium hydroxide in pores of the substrate D by: soaking the substrate D in an acidic solution containing at least one metal ions selected from the group consisting of yttrium ions, ytterbium ions and calcium ions; drying thus soaked substrate D; and then soaking thus dried substrate D in an alkaline solution, to prepare an additive carried-substrate E.

It is preferable that in the substrate E, the total amount of at least one selected from the group consisting of yttrium, ytterbium and calcium is not less than 0.2 mol % and not more than 2 mol % relative to the amount of nickel contained in the active material.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
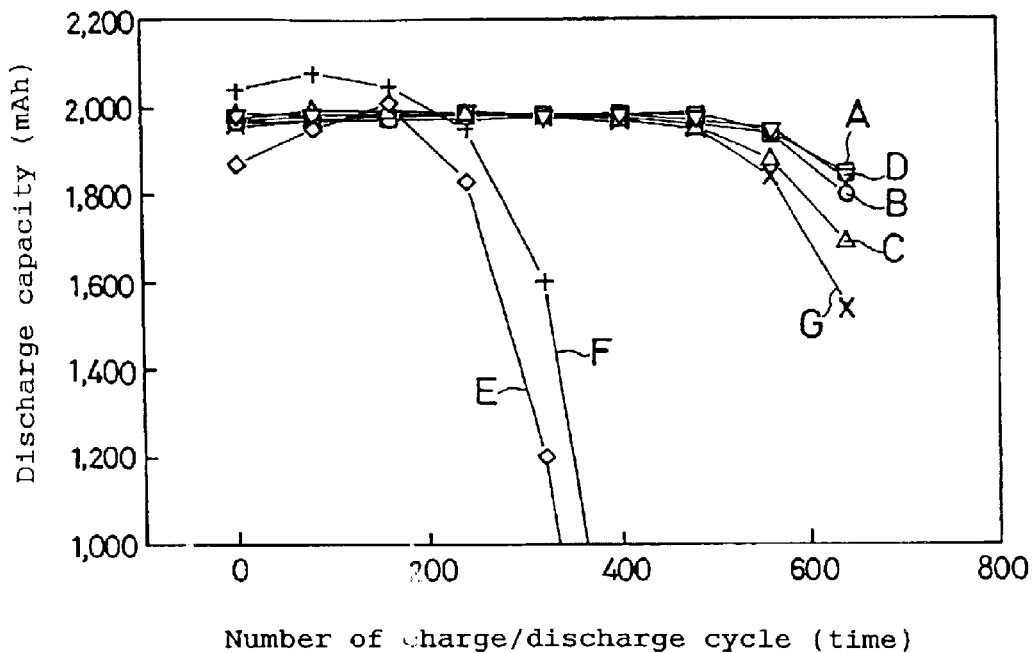
FIG. 1 is a graph representing the relations between the number of charge/discharge cycle and the discharge capacity of Batteries A to G.

In the sintered-type nickel positive electrode produced according to the present invention, the surface of the sintered nickel substrate is coated with a mixed layer comprising cobalt oxide having a mean cobalt valence of over 2 and at least one selected from the group consisting of magnesium hydroxide, iron hydroxide and manganese hydroxide. The outer face of this mixed layer is coated with the active material comprising nickel hydroxide. Since cobalt contained in the cobalt hydroxide has a mean valence of more than 2, however, the production of a solid solution by a reaction of nickel nitrate with magnesium, iron or manganese is suppressed. Thereby, decomposition of the active material in the charged state is suppressed and progress of the self-discharge is thus suppressed.

It is preferable that cobalt on the sintered nickel substrate is oxidized until the mean valence thereof exceeds 3. Oxide or hydroxide of magnesium, iron or manganese has poor conductivity, but when cobalt is oxidized to have the mean valence of over 3, highly favorable conductivity is imparted to the mixed layer As a result, a satisfactory electrical connection between the active material comprising nickel hydroxide and the sintered nickel substrate is obtained. Thereby, a utilization rate of the active material is improved and the internal resistance of the battery is reduced.

One example of the methods for producing the sintered-type nickel positive electrode in accordance with the present invention will be described in detail below:

Step (1)

In Step (1), a metal salt carried-substrate A is prepared. Step (1) comprises: soaking a sintered nickel substrate in an acidic aqueous solution, at a liquid temperature of from 20 to 40° C., containing cobalt ions and at least one metal ions selected from the group consisting of magnesium ions, iron ions and manganese ions for e.g. 3 to 20 minutes; and drying the soaked substrate at from e.g. 80 to 120° C.

As for the sintered nickel substrate, a conventionally known one may be employed without any specific limitation. The apparent thickness of the sintered nickel substrate is preferably from 0.3 to 0.8 mm, and the porosity thereof is preferably from 60 to 85%.

It is preferable that the pH of the acidic solution is kept at 3 or less. The acidic solution is prepared by dissolving, in water, a cobalt salt and at least one salt selected from the group consisting of magnesium salt, iron salt and manganese salt, and adjusting the pH of the solution.

As the magnesium salt used is magnesium nitrate or the like. As iron salt used is iron(III) nitrate or the like. As manganese salt used is manganese nitrate or the like. Those may be used singly or in combination of two or more of them. By making those elements present in the vicinity of the sintered nickel substrate, oxidation of the sintered nickel substrate and production of $\gamma$-NiOOH due to charge/discharge can be suppressed, and hence swelling of the electrode plate can be suppressed.

In the acidic aqueous solution, the concentration of the total amount of cobalt ions and at least one metal ions selected from the group consisting of magnesium ions, iron ions and manganese ions is preferably from 1.2 to 2.0 mol/liter, and more preferably from 1.4 to 1.7 mol/liter. When the concentration of the total amount is less than 1.2 mol/liter, the amount of hydroxide to be deposited on the substrate becomes too small to obtain an anti-corrosive effect on the substrate in impregnating the active material or at the time of the charge/discharge cycle. On the other hand, when the concentration of the total amount is over 2.0 mol/liter, the amount of hydroxide to be deposited on the substrate becomes so large as to cause a decrease in the amount of active material to be filled, reducing the capacity of the positive electrode.

In the acidic aqueous solution, the proportion of cobalt ions in the total amount of cobalt ions and at least one metal ions selected from the group consisting of magnesium ions, iron ions and manganese ions is preferably from 30 to 70 mol %, and more preferably from 50 to 65 mol %. When the proportion of cobalt ions is less than 30 mol %, the proportion of cobalt hydroxide to be deposited on the substrate becomes so small as to cause an increase in the proportion of hydroxide of the element having poor conductivity, resulting in increased internal resistance of the battery. On the other hand, when the proportion of cobalt ions is more than 70 mol %, the proportion of cobalt in the vicinity of the substrate becomes so large as to prone to change the active material to $\gamma$-NiOOH in charging, leading to shorter cycle life.

Step (2)

In Step (2), a hydroxide carried-substrate B is prepared. Step (2) comprises soaking the substrate A in an alkaline solution for 10 to 30 minutes, for example, to deposit cobalt hydroxide and at least one selected from the group consisting of magnesium hydroxide, iron hydroxide and manganese hydroxide in the pores of and on the surface of the substrate A.

As for the alkaline solution, a sodium hydroxide aqueous solution with a specific gravity of from 1.2 to 1.4, at a liquid temperature of from 20 to 90° C., is preferably used.

Step (3)

In Step (3), hydroxide carried-substrate C is prepared. Step (3) comprises oxidizing the cobalt hydroxide to produce cobalt oxide having a mean cobalt valence of over 2. While it is enough that the mean cobalt valence exceed 2, it is preferably made not less than 3. When the mean cobalt valence is not more than 2, in subsequent Step (4), cobalt ions are likely to be eluted into the solution containing nickel nitrate dissolved therein, and thereby a solid solution of nickel hydroxide and cobalt or the like is prone to be produced. With the solid solution produced, decomposition of the active material in the charged state is accelerated and the self-discharge proceeds.

It is effective for the oxidation of cobalt hydroxide to expose the substrate B in a state of including the alkaline solution used in Step (2) to an air atmosphere, at a temperature of not lower than 100° C. and not higher than 150° C. When the temperature is below 100° C., the oxidation of cobalt hydroxide does not proceed sufficiently. When the temperature is over 150° C., on the other hand, even the sintered nickel substrate is oxidized, decreasing the utilization rate of the active material.

It is also possible to electrochemically oxidize the substrate B in the state of being soaked in the alkaline solution used in Step (2). At that time, a current density per the apparent surface area of the substrate B is preferably from 0.2 to 1.0 mAh/cm².

After the oxidation of the cobalt hydroxide, the substrate is washed with water, and the alkaline component is removed to a certain degree. Since a slight amount of alkaline component contained in cobalt oxide has the function of suppressing the production of the solid solution, it is preferable that the washing is finished at the moment that pH of the discharged water used for the washing decreases to below 10.5.

Step (4)

In Step (4), an active material carried-substrate D (a sintered-type nickel positive electrode) is prepared. Step (4) comprises soaking the substrate C in a solution containing nickel nitrate dissolved therein for 3 to 20 minutes, followed by drying at from 80 to 120° C. and soaking in an alkaline solution for 10 to 30 minutes to fill an active material comprising nickel hydroxide in the pores of the substrate C. Normally, this series of steps is repeated multiple times.

As for the solution containing nickel nitrate dissolved therein, an acidic nickel nitrate aqueous solution of pH 1.0 or less with a specific gravity of from 1.65 to 1.80, at a liquid temperature of from 70 to 90° C. is preferably used.

As for the alkaline solution to be used next, a sodium hydroxide aqueous solution with a specific gravity of from 1.2 to 1.4 at a liquid temperature of from 60 to 90° C. is preferably used.

Even when the substrate C carrying cobalt oxide having a mean cobalt valence of over 2 is soaked in the acidic solution containing nickel nitrate dissolved therein, the production of solid solution of nickel hydroxide including cobalt and the like is largely limited, because cobalt oxide having a mean cobalt valence of over 2 has small solubility to the nitric acid aqueous solution. Further, a slight amount of alkaline component contained in the cobalt oxide also has the effect of suppressing the production of the solid solution. For these reasons, the decomposition of the active material in the charged state is not accelerated, and there is thus little deterioration of the self-discharge characteristic. Also because cobalt oxide serves as an anti-corrosive film, the sintered nickel substrate does not corrode in the acidic solution containing nickel nitrate dissolved therein, allowing the strength of the substrate to remain high.

Generally, in an alkaline secondary battery using a sintered-type nickel positive electrode, the reaction (1) of charging, the reaction (2) of generating oxygen and the reaction (3) of oxidizing the sintered nickel substrate simultaneously and contendingly occur at the end stage of charging.

$$Ni(OH)_2 + OH^- \rightarrow NiOOH + H_2O + e^- \quad (1)$$

$$4OH^- \rightarrow O_2 + 2H_2O + 4e^- \quad (2)$$

$$Ni + 2OH^- \rightarrow Ni(OH)_2 + 2e^- \quad (3)$$

In particular, when yttrium or ytterbium to enhance the charge efficiency of the positive electrode is applied to the surface of the positive electrode active material under a high-temperature atmosphere, the reaction (2) is suppressed, whereas the reaction (3) of oxidizing the sintered nickel substrate is accelerated. Since the oxidation of the sintered nickel substrate weakens the strength of the substrate while changing metal nickel to nickel hydroxide, thereby to increase the volume of the substrate, the electrode plate swells to promote uneven distribution of the electrolyte, decreasing the longevity of the battery.

It has been generally known that addition of a compound comprising magnesium, iron or manganese to a positive electrode lowers a charge efficiency (e.g. P. D. Bennett, T. Sakai, Hydrogen and Metal Hydride Batteries, The Electrochemical Society, Inc., New Jersey, 1994, pp. 296–302). Arrangement of those compounds in the vicinity of the sintered nickel substrate lowers the charge efficiency of vicinity of the sintered nickel substrate, enabling the reaction (2) to be accelerated more than the reaction (3). Thereby, the oxidation of the sintered nickel substrate is suppressed to achieve an increase in longevity of the battery. Further, there is almost no change in charge efficiency of the battery as a whole even when the charge efficiency in the vicinity of the sintered nickel substrate decreases, because the surface area of the entire positive electrode active material is order-of-magnitude larger than that of the sintered nickel substrate.

Owing to the effects as thus described, the alkaline secondary battery with longevity can be provided without sacrificing such characteristics as the self-discharge characteristic and the charge efficiency at a high temperature.

It is possible to improve the charge efficiency of the battery by adding-at least one selected from the group consisting of yttrium, ytterbium and calcium to the substrate after the impregnation of the active material comprising nickel hydroxide in the pores of the substrate. At that time, the total amount of at least one selected from the group consisting of yttrium, ytterbium and calcium is preferably not less than 0.2 mol % and not more than 2 mol % relative to the amount of nickel contained in the active material. When this rate is less than 0.2 mol %, the charge efficiency cannot be improved sufficiently. When it is more than 2 mol %, on the other hand, there is no significant change in effect of improving the charge efficiency.

In the following, a concrete description will be given to the present invention on the basis of examples:

In all of EXAMPLES and COMPARATIVE EXAMPLES described below, a sintered nickel substrate having a thickness of about 0.54 mm and a porosity of about 80% was used. This sintered nickel substrate was prepared by forming a sintered matter of a nickel powder on both faces of a nickel-plated core member comprising a punched sheet made of iron.

EXAMPLE 1

Step (1)

A nitric acid aqueous solution (pH 1.5) where 0.75 mol/liter each of cobalt nitrate and magnesium nitrate was dissolved was prepared. A sintered nickel substrate was soaked in the nitric acid aqueous solution (liquid temperature of 30° C.) for 5 minutes and then dried in an atmosphere at 100° C. for 20 minutes to obtain a substrate A1.

Step (2)

The substrate A1 was soaked in a sodium hydroxide aqueous solution with a specific gravity of 1.25 at a liquid temperature of 25° C. for 30 minutes to deposit a mixture of cobalt hydroxide and magnesium hydroxide in the pores of and on the surface of the substrate, so as to obtain a substrate B1.

Step (3)

The substrate B1 was taken out of the sodium hydroxide aqueous solution, and while being in a state of including the alkaline solution, the substrate B1 was exposed to an air atmosphere at a temperature of 130° C. for 30 minutes to oxidize the cobalt hydroxide until the mean cobalt valence became 3.2, so as to obtain a substrate C1. The substrate C1 was washed with water to remove excessive alkali until the pH of the discharged water decreased to below 10.5, and dried in an atmosphere at 100° C. for 20 minutes.

Step (4)

A nitric acid aqueous solution (pH 0.5, liquid temperature of 80° C., specific gravity of 1.75) where nickel nitrate was dissolved was prepared. The substrate C1 was soaked in the nitric acid aqueous solution for 15 minutes to impregnate nickel nitrate in the pores of the substrate C1, and was then dried in an atmosphere at 100° C. for 20 minutes. Subsequently, the substrate including nickel nitrate was soaked in a sodium hydroxide aqueous solution at a liquid temperature of 80° C. for 30 minutes to change nickel nitrate to nickel hydroxide. The sodium hydroxide aqueous solution had a specific gravity of 1.25 at a liquid temperature of 25° C. The substrate was then washed with water and dried.

This series of operations was repeated six times to obtain a substrate D1 (sintered-type nickel positive electrode). The electrode plate as thus produced is referred to as a positive electrode "a".

EXAMPLE 2

The following operations were conducted in the same manner as in EXAMPLE 1, except that iron(III) nitrate was used instead of magnesium nitrate.

Step (1)

A nitric acid aqueous solution (pH 1.5) where 0.75 mol/liter each of cobalt nitrate and iron nitrate was dissolved was prepared. The sintered nickel substrate was soaked in the nitric acid aqueous solution for 5 minutes and then dried in an atmosphere at 100° C. for 20 minutes to obtain a substrate A2.

Step (2)

The substrate A2 was soaked in a sodium hydroxide aqueous solution with a specific gravity of 1.25 at a liquid temperature of 25° C. for 30 minutes to deposit a mixture of cobalt hydroxide and iron hydroxide in the pores and on the surface of the substrate, so as to obtain a substrate B2.

Step (3)

The substrate B2 was taken out of the sodium hydroxide aqueous solution, and while being in a state of including the alkaline solution, the substrate B2 was exposed to an air atmosphere at a temperature of 130° C. for 30 minutes to oxidize the cobalt hydroxide until the mean cobalt valence became 3.2, so as to obtain a substrate C2. The substrate C2 was washed with water to remove excessive alkali until the pH of the discharged water decreased to below 10.5, and dried in an atmosphere at 100° C. for 20 minutes.

Step (4)

A nitric acid aqueous solution (pH 0.5, liquid temperature of 80° C., specific gravity of 1.75) where nickel nitrate was dissolved was prepared. The substrate C2 was soaked in the nitric acid aqueous solution for 15 minutes to impregnate nickel nitrate in the pores of the substrate C2, and was then dried in an atmosphere at 100° C. for 20 minutes. Subsequently, the substrate including nickel nitrate was soaked in a sodium hydroxide aqueous solution at a liquid temperature of 80° C. for 30 minutes to change nickel nitrate to nickel hydroxide. The sodium hydroxide aqueous solution had a specific gravity of 1.25 at a liquid temperature of 25° C. The substrate was then washed with water and dried.

This series of operations was repeated six times to obtain a substrate D2 (sintered-type nickel positive electrode). The electrode plate as thus produced is referred to as a positive electrode "b".

EXAMPLE 3

The following operations were conducted in the same manner as in EXAMPLE 1, except that manganese nitrate was used instead of magnesium nitrate.

Step (1)

A nitric acid aqueous solution (pH 1.5) where 0.75 mol/liter each of cobalt nitrate and manganese nitrate was dissolved was prepared. The sintered nickel substrate was soaked in the nitric acid aqueous solution for 5 minutes and then dried in an atmosphere at 100° C. for 20 minutes to obtain a substrate A3.

Step (2)

The substrate A3 was soaked in a sodium hydroxide aqueous solution with a specific gravity of 1.25 at a liquid temperature of 25° C. for 30 minutes to deposit a mixture of cobalt hydroxide and manganese hydroxide in the pores and on the surface of the substrate, so as to obtain a substrate B3.

Step (3)

The substrate B3 was taken out of the sodium hydroxide aqueous solution, and while being in a state of including the alkaline solution, the substrate B3 was exposed to an air atmosphere at a temperature of 130° C. for 30 minutes to oxidize cobalt hydroxide until the mean cobalt valence became 3.2, so as to obtain a substrate C3. The substrate C3 was washed with water to remove excessive alkali until the pH of the discharged water decreased to below 10.5, and dried in an atmosphere at 100° C. for 20 minutes.

Step (4)

A nitric acid aqueous solution (pH 0.5, liquid temperature of 80° C., specific gravity of 1.75) where nickel nitrate was dissolved was prepared. The substrate C3 was soaked in the nitric acid aqueous solution for 15 minutes to impregnate nickel nitrate in the pores of the substrate C3, and was then dried in an atmosphere at 100° C. for 20 minutes. Subsequently, the substrate including nickel nitrate was soaked in a sodium hydroxide aqueous solution at a liquid temperature of 80° C. for 30 minutes to change nickel nitrate to nickel hydroxide. The sodium hydroxide aqueous solution had a specific gravity of 1.25 at a liquid temperature of 25° C. The substrate was then washed with water and dried.

This series of operations was repeated six times to obtain a substrate D3 (sintered-type nickel positive electrode). The electrode plate as thus produced is referred to as a positive electrode "c".

EXAMPLE 4

The same operations as in EXAMPLE 1 were conducted, except that herein cobalt hydroxide was oxidized electrochemically. In other words, the same operations as in EXAMPLE 1 were conducted, except that, in Step (3), instead of oxidizing cobalt hydroxide by exposing the substrate B1 in the state of including the alkaline solution to an air atmosphere at a temperature of 130° C. for 30 minutes, cobalt hydroxide was electrochemically oxidized in the sodium hydroxide aqueous solution with a specific gravity of 1.25 at a liquid temperature of 25° C. until the mean cobalt valence became 2.9. The substrate D4 as thus produced (sintered-type nickel positive electrode) is referred to as a positive electrode "d". It is to be noted that in the step of electrochemically oxidizing cobalt hydroxide, a current density per the apparent surface area of the substrate was set to be 0.5 mAh/cm$^2$.

Comparative Example 1

Steps (1) to (3) were not conducted, but only Step (4) was conducted. Namely, the sintered nickel substrate, as is, was soaked for 15 minutes in a nitric acid aqueous solution (pH 0.5, liquid temperature of 80° C., specific gravity of 1.75) containing nickel nitrate dissolved therein to impregnate nickel nitrate in the pores of the substrate, and was then dried in an atmosphere at 100° C. for 20 minutes. Subsequently, the substrate including nickel nitrate was soaked in a sodium hydroxide aqueous solution at a liquid temperature of 80° C. for 30 minutes to change nickel nitrate to nickel hydroxide. The sodium hydroxide aqueous solution had a specific gravity of 1.25 at a liquid temperature of 25° C. The substrate was then washed with water and dried.

This series of operations was repeated six times to obtain a substrate DR1 (sintered-type nickel positive electrode). The electrode plate as thus produced is referred to as a positive electrode "e".

Comparative Example 2

The following operations were conducted in the same manner as in EXAMPLE 1, except that herein magnesium nitrate was not used in Step (1).

Step (1)

A nitric acid aqueous solution (pH 1.5) where 0.75 mol/liter of cobalt nitrate was dissolved was prepared. The sintered nickel substrate was soaked in the nitric acid aqueous solution for 5 minutes and then dried in an atmosphere at 100° C. for 20 minutes to obtain a substrate AR2.

Step (2)

The substrate AR2 was soaked in a sodium hydroxide aqueous solution with a specific gravity of 1.25 at a liquid temperature of 25° C. for 30 minutes to deposit cobalt hydroxide in the pores and on the surface of the substrate, so as to obtain a substrate BR2.

Step (3)

The substrate BR2 was taken out of the sodium hydroxide aqueous solution, and while being in a state of including the alkaline solution, the substrate BR2 was exposed to an air atmosphere at a temperature of 130° C. for 30 minutes to oxidize the cobalt hydroxide until the mean cobalt valence became 3.2, so as to obtain a substrate CR2. The substrate CR2 was washed with water to remove excessive alkali until the pH of the discharged water decreased to below 10.5, and dried in an atmosphere at 100° C. for 20 minutes.

Step (4)

A nitric acid aqueous solution (pH 0.5, liquid temperature of 80° C., specific gravity of 1.75) where nickel nitrate was dissolved was prepared. The substrate CR2 was soaked in the nitric acid aqueous solution for 15 minutes to impregnate nickel nitrate in the pores of the substrate CR2, and was then dried in an atmosphere at 100° C. for 20 minutes. Subsequently, the substrate including nickel nitrate was soaked in a sodium hydroxide aqueous solution at a liquid temperature of 80° C. for 30 minutes to change nickel nitrate to nickel hydroxide. The sodium hydroxide aqueous had a specific gravity of 1.25 at a liquid temperature of 25° C. The substrate was then washed with water and dried.

This series of operations was repeated six times to obtain a substrate DR2 (sintered-type nickel positive electrode). The electrode plate as thus produced is referred to as a positive electrode "f".

Comparative Example 3

The same operations as in EXAMPLE 1 were conducted, except that Step (3) for oxidizing cobalt hydroxide to produce cobalt oxide having a mean cobalt valence of over 2 was not conducted here after Step (2). Namely, after conducting Steps (1) and (2) as in the same manner as in Example 1, the substrate was taken out of the sodium hydroxide aqueous solution and washed with water to remove excessive alkali until the pH of the discharged water decreased to below 10.5, and was then dried in an atmosphere at 100° C. for 20 minutes. Subsequently, Step (4) was conducted to obtain a substrate DR3 (sintered-type nickel positive electrode). The electrode plate as thus produced is referred to as a positive electrode "g".

The positive electrodes "a" to "g" as thus produced were cut into a size of width of 35 mm and length of 280 mm. Subsequently, a given positive electrode and a paste-type negative electrode comprising hydrogen storage alloy having a thickness of 0.27 mm and a length of 330 mm were arranged with a separator (thickness of 0.18 mm) interposed therebetween, and were wound into a coil form with the use of a core having a diameter of 4.5 mm, to produce a F-SC size nickel-metal hydride battery having a diameter of 22 mm and a height of 42.5 mm.

A battery produced using the positive electrode "a" is referred to as Battery A. Likewise, batteries produced using the positive electrodes "b", "c", "d", "e"n, "f", and "g" are referred to as Batteries B, C, D, E, F and G, respectively.

Batteries A to G produced were charged at 400 mA for 6 hours, followed by a one-hour-rest and then discharged at 400 mA until the battery voltage became 1.0 V, followed by another one-hour rest. This pattern of charge/discharge cycle was repeated ten times to activate the batteries.

Batteries A to G having being activated were subjected to tests for evaluating the charge efficiency, the storage characteristic and the cycle life, respectively. Methods for the respective tests are as follows:

[Charge Efficiency]

A battery whose SOC (state of charge) was 0% was charged at 400 mA in an atmosphere at 25° C. or 45° C. for 6 hours, and left still in an atmosphere at 25° C. for 3 hours, and was thereafter discharged at 400 mA until the battery voltage became 1.0 V, to determine discharge capacities in charging at 25° C. and 45° C., respectively. Subsequently, the proportion of the discharge capacity in charging at 45° C. to the discharge capacity in charging at 25° C. was determined on percentage as the discharge efficiency. The results are shown in Table 1.

TABLE 1

| Battery | Discharge capacity after charging at 25° C. | Discharge capacity after charging at 45° C. | Charge efficiency |
|---|---|---|---|
| A | 2,032 mAh | 1,687 mAh | 83.0% |
| B | 2,029 mAh | 1,682 mAh | 82.9% |
| C | 2,043 mAh | 1,693 mAh | 82.9% |
| D | 2,045 mAh | 1,690 mAh | 82.6% |
| E | 1,930 mAh | 1,612 mAh | 83.5% |
| F | 2,103 mAh | 1,790 mAh | 85.1% |
| G | 2,056 mAh | 1,604 mAh | 78.0% |

[Storage Characteristic]

A battery whose SOC was 0% was charged at 400 mA in an atmosphere at 25° C. for 6 hours, and left still in an atmosphere at 25° C. for 3 hours or 14 days, and was thereafter discharged at 400 mA until the battery voltage became 1.0 V, to determine discharge capacities after the battery was left still for 3 hours and for 14 days, respectively. Subsequently, the proportion of the discharge capacity after the battery was left still for 14 days to the discharge capacity after the battery was left still for 3 hours was determined on percentage as the storage characteristic. The results are shown in Table 2.

TABLE 2

| Battery | Discharge capacity after left for 3 hours | Discharge capacity after left for 14 days | Capacity maintenance rate |
|---|---|---|---|
| A | 2,032 mAh | 1,837 mAh | 90.4% |
| B | 2,029 mAh | 1,810 mAh | 89.2% |
| C | 2,043 mAh | 1,843 mAh | 90.2% |
| D | 2,045 mAh | 1,847 mAh | 90.3% |
| E | 1,930 mAh | 1,758 mAh | 91.1% |
| F | 2,103 mAh | 1,920 mAh | 91.3% |
| G | 2,056 mAh | 1,741 mAh | 84.7% |

[Cycle Life]

The battery was charged at 1,000 mA in an atmosphere at 25° C. for 2 hours and 12 minutes, and then promptly discharged at 1,000 mA until the battery voltage became 1.0 V. This pattern of charge/discharge cycle was repeated to determine a relation between the number of charge/discharge cycle (time) and the battery capacity (mAh). The results are shown in FIG. 1.

It is found from Tables 1 and 2, and FIG. 1, that Batteries A to D have: the charge efficiency of about from 82 to 83%; the capacity maintenance rate of about 90% after left still for 14 days at 25° C.; and excellent cycle life.

On the other hand, compared with Batteries A to D, Battery E has a smaller initial discharge capacity and poorer cycle life, while having a comparable charge efficiency and capacity maintenance rate. Also compared with Batteries A to D, Battery F has poorer cycle life, while having a larger initial discharge capacity, and a comparable discharge efficiency and capacity maintenance rate. Also compared with Batteries A to D, Battery G has a lower charge efficiency and capacity maintenance rate, while having a comparable cycle life characteristic.

It was revealed from the above results that a positive electrode to provide a totally excellent battery from viewpoints of e.g. the initial discharge capacity, charge efficiency, capacity maintenance rate and cycle life can be obtained by depositing cobalt hydroxide and at least one selected from the group consisting of magnesium hydroxide, iron hydroxide and manganese hydroxide on the sintered nickel substrate by Steps (1) and (2), and then by oxidizing the cobalt hydroxide deposited on the substrate, before the active material was filled in the pores of the sintered nickel substrate.

EXAMPLE 5

Next studied were the amount of cobalt hydroxide to be deposited in the pores and on the surface of the sintered nickel substrate and the amount of one or more selected from the group consisting of magnesium hydroxide, iron hydroxide and manganese hydroxide. Herein, solutions, containing cobalt ions and magnesium ions at a molar ratio of 1:1 with respectively different concentrations of the total amount of those two metal ions, were prepared for the study.

Nitric acid aqueous solutions (pH 1.5), containing cobalt nitrate and magnesium nitrate at a molar ratio of 1:1 with concentrations of the total amount of cobalt ions and magnesium ions of 1.0 mol/liter(M), 1.2 M, 1.5 M, 1.8 M, 2.0 M and 2.5 M, were prepared.

Sintered nickel positive electrodes were prepared in the same manner as in Example 1, except that herein the aforesaid nitric acid aqueous solutions were used in Step (1). Positive electrodes obtained by using the nitric acid aqueous solutions with concentrations of the total amount of cobalt ions and magnesium ions of 1.0 M, 1.2 M, 1.5 M, 1.8 M, 2.0 M and 2.5 M are referred to as positive electrodes a (1.0), a (1.2), a (1.5), a (1.8), a (2.0) and a (2.5), respectively. F-SC size nickel-metal hydride storage batteries produced using the above positive electrodes in the same manner as in EXAMPLE 1 are referred to as Batteries A (1.0), A (1.2), A (1.5), A (1.8), A (2.0) and A (2.5), respectively.

After activating Batteries A (1.0) to A (2.5) in the same manner as described above, the charge efficiency and the cycle life of each battery were determined. Results are shown in Table 3 and FIG. 2.

TABLE 3

| Battery | Discharge capacity after charging at 25° C. | Discharge capacity after charging at 45° C. | Charge efficiency |
|---|---|---|---|
| A (1.0) | 2,025 mAh | 1,683 mAh | 83.1% |
| A (1.2) | 2,021 mAh | 1,677 mAh | 83.0% |
| A (1.5) | 2,032 mAh | 1,692 mAh | 83.3% |
| A (1.8) | 2,030 mAh | 1,687 mAh | 83.1% |
| A (2.0) | 2,025 mAh | 1,680 mAh | 83.0% |
| A (2.5) | 1,945 mAh | 1,621 mAh | 83.3% |

It is found from Table 3 that even with the concentration of metal ions in the nitric acid aqueous solution varied, no substantial difference occurs in the charge efficiency. However, in comparing the capacities in the case of charging the batteries at 25° C., there was observed a decrease in capacity when the concentration of the total amount of cobalt ions and magnesium ions was 2.5 M. This is presumably because the amounts of cobalt hydroxide and magnesium hydroxide deposited in the pores and on the surface of the substrate became so large as to decrease the amount of active material to be filled, and thus the positive electrode capacity decreased.

Figure 2:
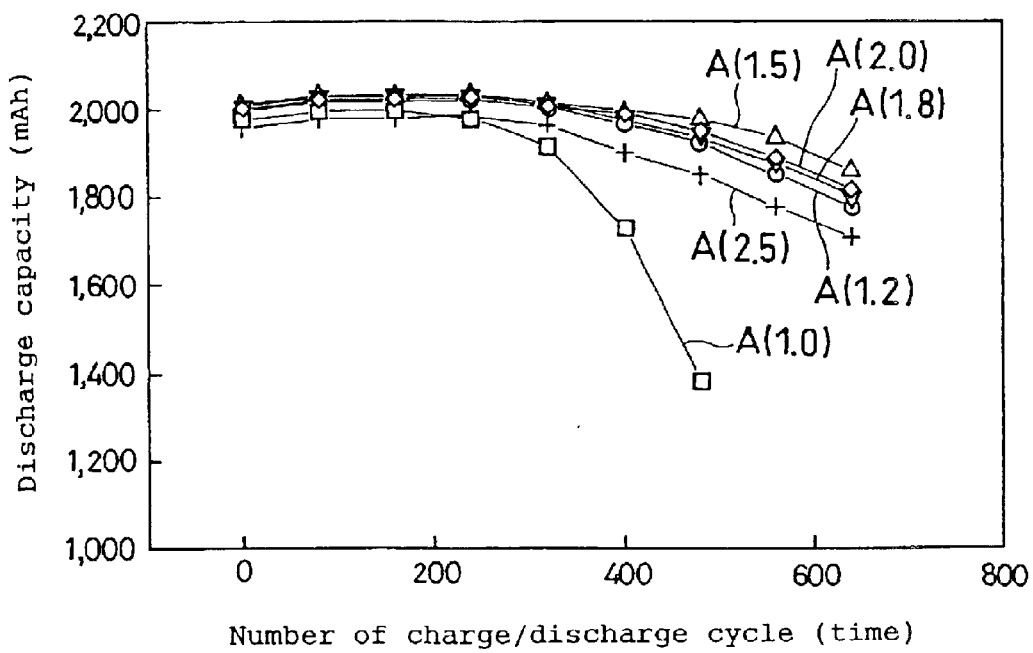
FIG. 2 is a graph representing the relations between the number of charge/discharge cycle and the discharge capacity of Batteries A (1.0) to A (2.5).

In FIG. 2, there are not significant differences in cycle life among Batteries A (1.2) to A (2.0), but the cycle life of Battery A (1.0) is inferior to those of the other batteries. This is presumably because the amounts of cobalt hydroxide and magnesium hydroxide deposited in the pores and on the surface of the substrate were too small to have the effect of improving the cycle life. On the other hand, Battery A (2.5)

has a smaller discharge capacity than Batteries A (1.2) to A (2.0), while having as good cycle life as those batteries.

It can be concluded from the above results that the desirable concentration of the total amount of cobalt ions and at least one metal ions selected from the group consisting of magnesium ions, iron ions and manganese ions is not less than 1.2 M and not more than 2.0 M in the nitric acid aqueous solution to be used for depositing hydroxide in the pores and on the surface of the substrate.

EXAMPLE 6

Next studied was the molar ratio between cobalt hydroxide to be deposited in the pores and on the surface of the sintered nickel substrate and one or more selected from the group consisting of magnesium hydroxide, iron hydroxide and magnesium hydroxide. Herein, solutions containing cobalt ions and magnesium ions at respectively different molar ratios with the concentration of the total amount of those two metal ions of 1.5 mol/liter(M), were prepared for the study.

Nitric acid aqueous solutions (pH 1.5) with the concentration of the total amount of cobalt ions and magnesium ions of 1.5 M, where the proportions of cobalt nitrate in the total amount of cobalt nitrate and magnesium nitrate were 10 mol %, 30 mol %, 50 mol %, 70 mol % and 90 mol %, were prepared.

Sintered nickel positive electrodes were prepared in the same manner as in Example 1, except that herein the aforesaid nitric acid aqueous solutions were used in Step (1). Positive electrodes obtained by using the nitric acid aqueous solutions where the proportions of cobalt nitrate in the total amount of cobalt nitrate and magnesium nitrate were 10 mol %, 30 mol %, 50 mol %, 70 mol % and 90 mol % are referred to as positive electrodes a (10), a (30), a (50), a (70) and a (90), respectively. F-SC size nickel-metal hydride storage batteries produced using the above positive electrodes in the same manner as in EXAMPLE 1 are referred to as Batteries A (10), A (30), A (50), a (70) and A (90), respectively.

Batteries A (10) to A (90) were activated in the same manner as described above to determine the charge efficiency and the cycle life of each battery. Results are shown in Table 4 and FIG. 3.

TABLE 4

| Battery | Discharge capacity after charging at 25° C. | Discharge capacity after charging at 45° C. | Charge efficiency |
|---|---|---|---|
| A (10) | 2,011 mAh | 1,532 mAh | 76.2% |
| A (30) | 2,028 mAh | 1,665 mAh | 82.1% |
| A (50) | 2,026 mAh | 1,698 mAh | 83.8% |
| A (70) | 2,031 mAh | 1,708 mAh | 84.1% |
| A (90) | 2,055 mAh | 1,784 mAh | 86.8% |

In Table 4, Battery A (10) where the proportion of cobalt is the smallest has a lower charge efficiency than the other batteries. This is presumably because the amount of cobalt was so small that the effect, by a slight amount of alkaline component contained in cobalt oxide, of preventing the production of a solid solution of nickel hydroxide and cobalt (and magnesium), was lost, and that anti-corrosive effect by the cobalt oxide became so small as to allow a part of nickel hydroxide and magnesium hence to form a solid solution, resulting in a decrease in charge efficiency.

Figure 3:
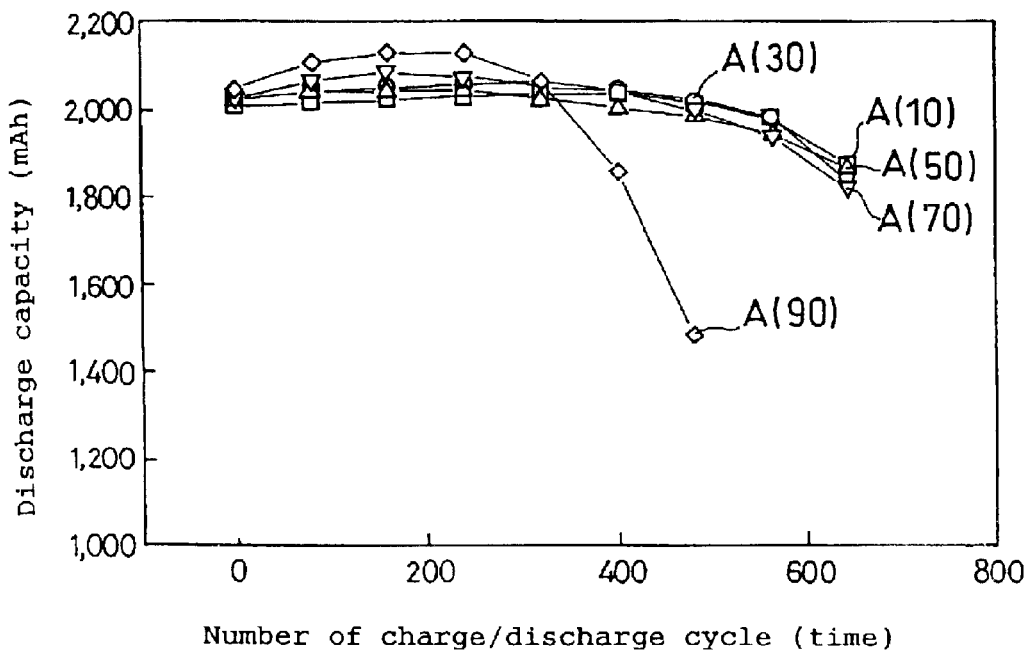
FIG. 3 is a graph representing the relations between the number of charge/discharge cycle and the discharge capacity of Batteries A (10) to A (90).

In FIG. 3, the cycle life of Battery A (90) where the proportion of cobalt is the largest is greatly inferior to those of the other batteries. This is presumably because the proportion of cobalt in the vicinity of the sintered nickel substrate became larger to make the active material prone to change to γ-NiOOH in charging.

It can be concluded from the above results that the desirable proportion of cobalt ions in the total amount of cobalt ions and at least one metal ions selected from the group consisting of magnesium ions, iron ions and manganese ions is not less than 30 mol % and not more than 70 mol % in the nitric acid aqueous solution to be used for depositing hydroxide in the pores and on the surface of the substrate.

EXAMPLE 7

A nitric acid aqueous solution (pH 1.5) where 0.1 mol/liter of yttrium nitrate was dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a yttrium hydroxide in the pores and on the surface of the electrode plate. By conducting this series of operations once, an electrode plate having added thereto 0.1 mol % of yttrium relative to nickel contained in the active material was produced. The electrode plate as thus produced is referred to as a positive electrode "h".

EXAMPLE 8

By repeating the same series of operations as Example 7 twice, an electrode plate having added thereto 0.2 mol % of yttrium relative to nickel contained in the active material was produced. The electrode plate as thus produced is referred to as a positive electrode "i".

EXAMPLE 9

A nitric acid aqueous solution (pH 1.5) where 1.0 mol/liter of yttrium nitrate was dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a yttrium hydroxide in the pores and on the surface of the electrode plate.

By repeating this series of operations twice, an electrode plate having added thereto 1.0 mol % of yttrium relative to nickel contained in the active material was produced. The electrode plate as thus produced is referred to as a positive electrode "j".

EXAMPLE 10

A nitric acid aqueous solution (pH 1.5) where 1.5 mol/liter of yttrium nitrate was dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a yttrium hydroxide in the pores and on the surface of the electrode plate.

By repeating this series of operations three times, an electrode plate having added thereto 2.0 mol % of yttrium relative to nickel contained in the active material was produced. The electrode plate as thus produced is referred to as a positive electrode "k".

EXAMPLE 11

A nitric acid aqueous solution (pH 1.5) where 2.0 mol/liter of yttrium nitrate was dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a yttrium hydroxide in the pores and on the surface of the electrode plate.

By repeating this series of operations four times, an electrode plate having added thereto 3.0 mol % of yttrium relative to nickel contained in the active material was produced. The electrode plate as thus produced is referred to as a positive electrode "l".

Comparative Example 4

A nitric acid aqueous solution (pH 1.5) where 2.0 mol/liter of yttrium nitrate was dissolved was prepared. A positive electrode the same as the positive electrode "g" produced in COMPARTIVE EXAMPLE 3 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a yttrium hydroxide in the pores and on the surface of the electrode plate.

By repeating this series of operations twice, an electrode plate having added thereto 1.0 mol % of yttrium relative to nickel contained in the active material was produced. The electrode plate as thus produced is referred to as a positive electrode "m".

F-SC size nickel-metal hydride storage batteries produced in the same manner as in EXAMPLE 1, using the positive electrodes "h", "i", "j", "k", "l", and "m", are referred to as Batteries H, I, J., K, L and M.

After activating Batteries H to M in the same manner as described above, the charge efficiency and cycle life of each battery were determined. Results are shown in Table 5 and FIG. 4, together with the data of Battery A in EXAMPLE 1 and Battery G in COMPARATIVE EXAMPLE 3.

TABLE 5

| Battery | Proportion of yttrium | Discharge capacity after charging at 25° C. | Discharge capacity after charging at 45° C. | Charge efficiency |
| --- | --- | --- | --- | --- |
| A | 0 mol % | 2,032 mAh | 1,687 mAh | 83.0% |
| G | 0 mol % | 2,056 mAh | 1,604 mAh | 78.0% |
| H | 0.1 mol % | 2,035 mAh | 1,718 mAh | 84.4% |
| I | 0.2 mol % | 2,031 mAh | 1,801 mAh | 88.7% |
| J | 1.0 mol % | 2,043 mAh | 1,865 mAh | 91.3% |
| K | 2.0 mol % | 2,051 mAh | 1,897 mAh | 92.5% |
| L | 3.0 mol % | 2,038 mAh | 1,889 mAh | 92.7% |
| M | 1.0 mol % | 2,048 mAh | 1,722 mAh | 82.4% |

In Table 5, the batteries where the proportion of Y is from 0.2 to 3.0 mol % to nickel hydroxide as the active material have a charge efficiency of about 90%, which is larger improvement as compared with Battery A, whereas Battery H where the proportion of Y is 0.1 mol % exhibits small improvement in the charge efficiency thereof. The desirable proportion of Y is therefore not less than 0.2 mol %. Further, in comparing Battery L having the proportion of 3.0 mol % Y with Battery K having the proportion of 2.0 mol % Y, the charge efficiency is improved only by 0.2% despite an increase in proportion of Y by one and a half times. On the other hand, in EXAMPLE 11, the operation of soaking the positive electrode in the nitric acid aqueous solution including yttrium nitrate was repeated four times for obtaining the proportion of Y 3.0 mol %, and therefore, the number of operations has increased as compared with EXAMPLE 10 where the operation was repeated three times. Despite such an increase in the number of the operations in obtaining the proportion of Y 3.0 mol %, there is observed little improvement in charge efficiency, and it can thereby be said that the desirable proportion of Y is not more than 2.0 mol %. In comparing Battery M with Battery G which did not undergo the oxidation treatment of cobalt hydroxide deposited in the pores and on the surface of the sintered nickel substrate in advance of the impregnation of the active material, the charge efficiency is still lower as compared with that of Battery A of 83.0%, although it is improved from 78.0% to 82.4%.

Figure 4:
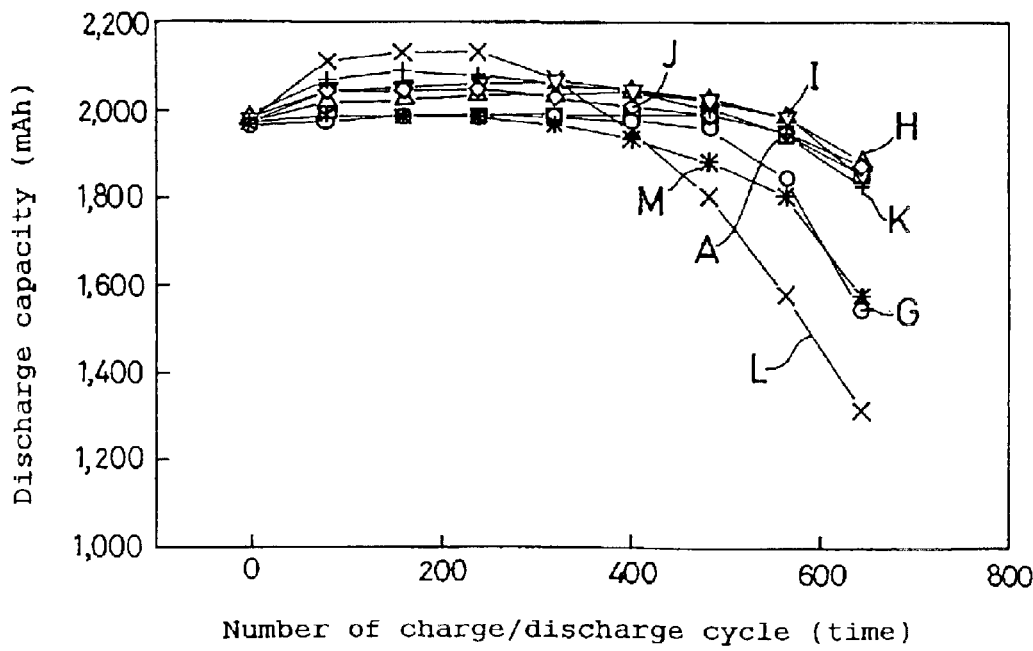
FIG. 4 is a graph representing the relations between the number of charge/discharge cycle and the discharge capacity of Batteries H to M, together with the data of Batteries A and G.

With regard to the cycle life characteristic shown in FIG. 4, Batteries G, L and M exhibited sharp decreases in capacity as compared with the other batteries. The cycle life of Battery L is shorter than those of Batteries H to K. This is presumably because the amount of Y added to the positive electrode was so large as to cause an increase in production of γ-NiOOH in charging nickel hydroxide.

It can be said from the above results that the optimum proportion of Y, which is to be added by soaking the positive electrode filled with nickel hydroxide in the nitric acid aqueous solution including yttrium ions, drying the same, and then soaking the same in an alkaline aqueous solution, is not less than 0.2 mol % and not more than 2.0 mol % relative to nickel contained in the active material.

EXAMPLE 12

A nitric acid aqueous solution (pH 1.5) where 2.0 mol/liter of cobalt nitrate and 1.0 mol/liter of yttrium nitrate were dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a mixture of cobalt hydroxide and yttrium hydroxide in the pores and on the surface of the electrode plate.

By repeating this series of operations twice, an electrode plate having added thereto 1.0 mol % of yttrium relative to nickel contained in the active material and also having added thereto cobalt hydroxide was produced. The electrode plate as thus produced is referred to as a positive electrode "n".

EXAMPLE 13

A nitric acid aqueous solution (pH 1.5) where 2.0 mol/liter of cobalt nitrate and 1.0 mol/liter of ytterbium nitrate were dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a mixture of cobalt hydroxide and ytterbium hydroxide in the pores and on the surface of the electrode plate.

By repeating this series of operations twice, an electrode plate having added thereto 1.0 mol % of ytterbium relative to nickel contained in the active material and also having added thereto cobalt hydroxide was produced. The electrode plate as thus produced is referred to as a positive electrode "o".

EXAMPLE 14

A nitric acid aqueous solution (pH 1.5) where 2.0 mol/liter of cobalt nitrate and 1.0 mol/liter of calcium nitrate were dissolved was prepared. A positive electrode the same as the positive electrode "a" produced in EXAMPLE 1 was soaked in this nitric acid aqueous solution for 5 minutes, dried in an atmosphere at 100° C. for 20 minutes, and then soaked in a sodium hydroxide aqueous solution with a specific gravity of 1.25 at a liquid temperature of 25° C. for 30 minutes to deposit a mixture of cobalt hydroxide and calcium hydroxide in the pores and on the surface of the electrode plate.

By repeating this series of operations twice, an electrode plate having added thereto 1.0 mol % of calcium relative to nickel contained in the active material and also having added thereto cobalt hydroxide was produced. The electrode plate as thus produced is referred to as a positive electrode "p".

F-SC size nickel-metal hydride storage batteries produced in the same manner as in EXAMPLE 1, using the positive electrodes "n", "o" and "p" are referred to as Batteries N, O and P.

After activating Batteries N to P in the same manner as described above, the charge efficiency and cycle life of each battery were determined. Results are shown in Table 6 and FIG. 5, together with the data of Battery J in EXAMPLE 9.

TABLE 6

| Battery | Element added after impregnation of active material | Discharge capacity after charging at 25° C. | Discharge capacity after charging at 45° C. | Charge efficiency |
| --- | --- | --- | --- | --- |
| J | Y | 2,043 mAh | 1,865 mAh | 91.3% |
| N | Y, Co | 2,138 mAh | 1,956 mAh | 91.5% |
| O | Yb, Co | 2,143 mAh | 1,969 mAh | 91.9% |
| P | Ca, Co | 2,128 mAh | 1,941 mAh | 91.2% |

In Table 6, Battery N using the positive electrode "n" obtained by further adding cobalt to the positive electrode "j", has a higher initial capacity than and a comparable charge efficiency with Battery J using the positive electrode "j". Batteries O and P using the positive electrodes having added thereto ytterbium and calcium, respectively, instead of yttrium, have higher initial capacities than and comparable charge efficiencies with Battery J, as in the case with Battery N.

Figure 5:
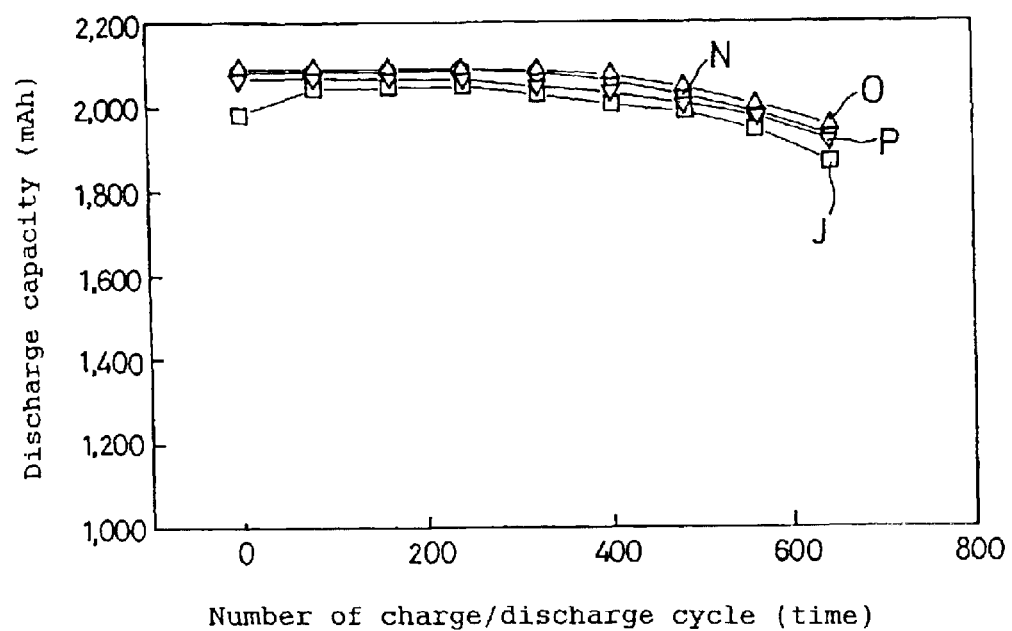
FIG. 5 is a graph representing the relations between the number of charge/discharge cycle and the discharge capacity of Batteries N to P, together with the data of Battery J.

Further, it is revealed from FIG. 5 that Batteries N to P, as well as Battery J, have long cycle life.

It is found from the above results that a battery with a high initial capacity, a high charge efficiency and long cycle life can be obtained by adding cobalt hydroxide and at least one hydroxide selected from the group consisting of yttrium hydroxide, ytterbium hydroxide and calcium hydroxide to the positive electrode having been filled with the active material.

As thus described, according to the present invention, it is possible to provide an alkaline secondary battery having long cycle life without sacrificing such characteristics as the self-charge characteristic and the charge efficiency at a high temperature.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a sintered-type nickel positive electrode for an alkaline secondary battery, comprising:

a step (1) of soaking a sintered nickel substrate in an acidic solution containing cobalt ions and at least one metal ions selected from the group consisting of magnesium ions, iron ions and manganese ions, and drying thus soaked substrate to prepare a metal salt carried-substrate A;

a step (2) of soaking said substrate A in an alkaline solution to deposit cobalt hydroxide and at least one selected from the group consisting of magnesium hydroxide, iron hydroxide and manganese hydroxide in pores of and on surface of said substrate, to prepare a hydroxide carried-substrate B;

a step (3) of oxidizing said cobalt hydroxide to produce cobalt oxide having a mean cobalt valence of over 2, to prepare an oxide carried-substrate C; and a step (4) of filling an active material comprising nickel hydroxide in pores of said substrate C by repeating a series of steps of soaking said substrate C in a solution containing nickel nitrate dissolved therein, drying thus soaked substrate C, and then soaking thus dried substrate C in an alkaline solution, to prepare an active material carried-substrate D.

2. The method for producing a sintered-type nickel positive electrode for an alkaline secondary battery in accordance with claim 1, wherein said step (3) comprises steps of providing said substrate B with an alkali and exposing said alkali provided-substrate B to an air atmosphere at a temperature of not lower than 100° C. and not higher than 150° C. to oxidize said cobalt hydroxide to produce cobalt oxide.

3. The method for producing a sintered-type nickel positive electrode for an alkaline secondary battery in accordance with claim 1, wherein said step (3) comprises a step of electrochemically oxidizing said substrate B in an alkaline solution to oxidize said cobalt hydroxide to produce cobalt oxide.

4. The method for producing a sintered-type nickel positive electrode for an alkaline secondary battery in accordance with claim 1, wherein said alkaline solution used in said step (2) is an aqueous solution containing sodium hydroxide dissolved therein.

5. The method for producing a sintered-type nickel positive electrode for an alkaline secondary battery in accordance with claim 1, wherein, in said acidic solution used in said step (1), the concentration of the total amount of said cobalt ions and said at least one metal ions is not less than 1.2 mol/liter and not more than 2.0 mol/liter, and the proportion of said cobalt ions in said total amount is not less than 30 mol % and not more than 70 mol %.

6. The method for producing a sintered-type nickel positive electrode for an alkaline secondary battery in accordance with claim 1, further comprising a step (5), subsequent to said step (4), of filling at least one additive selected from the group consisting of yttrium hydroxide, ytterbium hydroxide and calcium hydroxide in pores of said substrate D by: soaking said substrate D in an acidic solution containing at least one metal ions selected from the group consisting of yttrium ions, ytterbium ions and calcium ions; drying thus soaked substrate D; and then soaking thus dried substrate D in an alkaline solution, to prepare an additive carried-substrate E.

7. The method for producing a sintered-type nickel positive electrode for an alkaline secondary battery in accordance with claim 6, wherein, in said substrate E, the total amount of at least one selected from the group consisting of yttrium, ytterbium and calcium is not less than 0.2 mol % and not more than 2 mol % relative to the amount of nickel contained in said active material.

* * * * *